United States Patent [19]

Furihata et al.

[11] 4,368,354

[45] Jan. 11, 1983

[54] DISCRIMINATOR APPARATUS FOR DETECTING THE PRESENCE OF A SIGNAL BY USING A DIFFERENTIAL BEAT SIGNAL HAVING AN INAUDIBLE FREQUENCY

[75] Inventors: Makoto Furihata, Tachikawa; Masanori Oguino; Noboru Sakata, both of Yokohama, all of Japan

[73] Assignee: Hitachi, Ltd., Tokyo, Japan

[21] Appl. No.: 112,815

[22] Filed: Jan. 17, 1980

[30] Foreign Application Priority Data

Jan. 19, 1979 [JP] Japan .................................. 54-3959

[51] Int. Cl.³ .......................... H04H 5/00; H04N 7/00
[52] U.S. Cl. .............................. 179/1 GB; 179/1 GN; 455/71; 328/138; 358/144
[58] Field of Search ........... 179/1 GB, 1 GD, 84 VF, 179/1 GN; 455/227, 324, 71; 328/138; 329/50; 358/144

[56] References Cited

U.S. PATENT DOCUMENTS

| 2,965,717 | 12/1960 | Bell | 455/71 |
| 3,566,036 | 2/1971 | Roche | 455/71 |
| 4,048,654 | 9/1977 | Wegner | 358/144 |
| 4,281,217 | 7/1981 | Dolby | 179/1 GN |

Primary Examiner—Douglas W. Olms
Attorney, Agent, or Firm—Craig and Antonelli

[57] ABSTRACT

A discriminator apparatus for a television multivoice system comprises a mixer for mixing a program identifying signal with a reference signal thereby to produce a differential beat signal. A reference signal generator includes a signal source of an original frequency, and a frequency converter for converting the original frequency to the reference frequency which is close to the frequency of the program identifying signal and so selected that the frequency of the differential beat signal is lower than the lowest audible frequency. A low-pass filter is employed for extracting the differential beat signal. Need for expensive mechanical filters of a narrow fractional bandwidth is thereby eliminated.

5 Claims, 12 Drawing Figures

FIG. 1
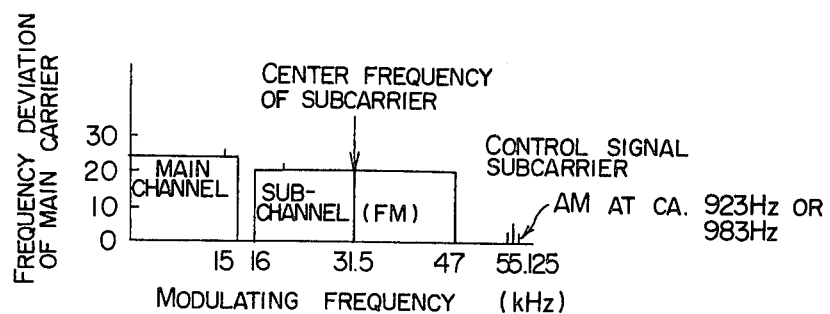
FIG. 5
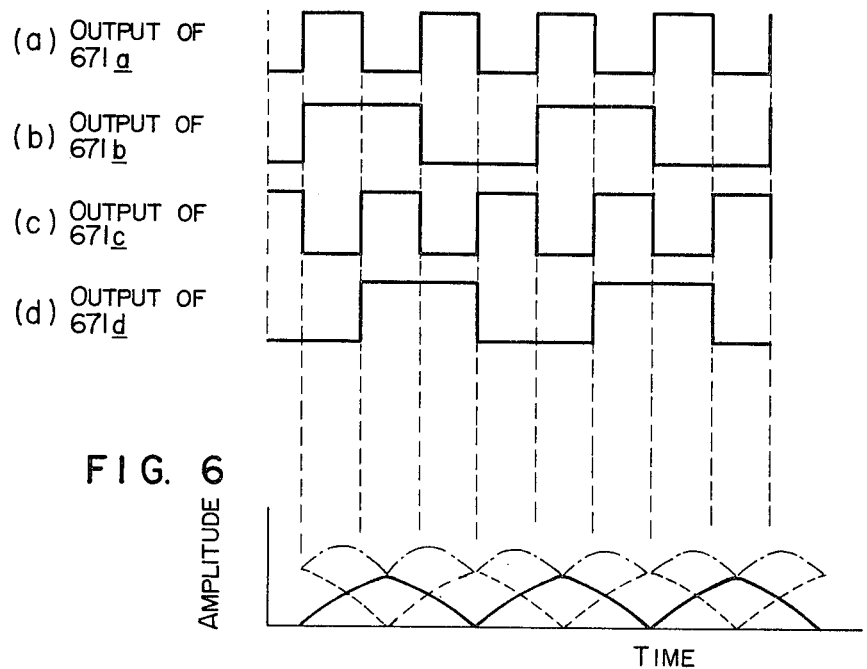
FIG. 6

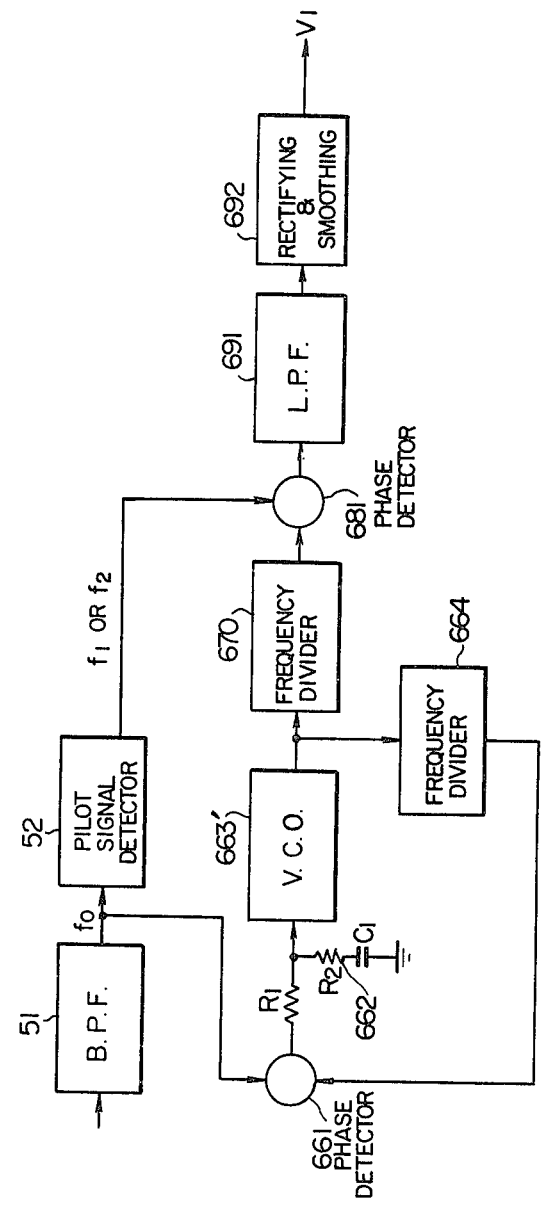

DISCRIMINATOR APPARATUS FOR DETECTING THE PRESENCE OF A SIGNAL BY USING A DIFFERENTIAL BEAT SIGNAL HAVING AN INAUDIBLE FREQUENCY

BACKGROUND OF THE INVENTION

1. Field of the Invention

The present invention relates in general to a discriminator apparatus for discriminating television broadcast program identifying signals. More particularly, the invention concerns a discriminator apparatus which can be applied to a television receiver of a multivoice system for discriminating the program identifying signals to determine whether a television program being currently broadcasted and to be received is in a stereophonic sound mode or in a heterogeneous voice mode (e.g. bilingual voice program in Japanese on one hand and a foreign language such as English on the other hand).

2. Description of the Prior Art

In the first place, description will be made of a hitherto known discriminator apparatus applied to a television receiver of a multivoice system in order to have a better understanding of the invention.

A television multivoice signal (multi-channel voice signal) exhibits such a frequency spectrum as illustrated in FIG. 1. More specifically, the multi-voice signal contains a main channel signal having a frequency distribution over a range of 50 Hz to $f_H$ where $f_H$ represents a horizontal synchronizing frequency of 15.750 kHz, a sub-channel signal which is obtained through frequency modulation of a voice or sound subcarrier of 2 $f_H$ (31.5 kHz) with a subsidiary sound or voice signal and has a frequency distribution over a range of $f_H$ to 3 $f_H$ (47.25 kHz), and a control signal obtained through amplitude modulation of a pilot carrier having a frequency of 3.5 $f_H$ (55.125 kHz) with a pilot signal having frequency of about 923 Hz or about 983 Hz.

In the case of a stereophonic television program broadcasting, a stereophonic sum signal (L+R) is transmitted as a main voice or sound signal, while a stereophonic difference signal (L−R) is transmitted as a subsidiary voice or sound signal. On the other hand, in the case of the mono-aural broadcasting, only the main voice or sound signal of the main channel is transmitted without being accompanied with the subsidiary or sound signal. Further, in the heterogeneous voice broadcasting mode such as bilingual programs in Japanese and English, for example, one of the voice signals is transmitted as the main voice signal with the other being transmitted as the subsidiary voice signal. Discrimination of the stereophonic broadcasting and the heterogeneous voice broadcasting from each other is effected with the aid of the pilot signal constituting the control signal. More specifically, in the case of a stereophonic television program, the control signal which is produced through amplitude modulation of the pilot carrier of 3.5 $f_H$ with the pilot signal $f_2$ of about 983 Hz is transmitted, while for a heterogeneous voice program the control signal is transmitted which is produced by subjecting the pilot carrier of 3.5 $f_H$ to an amplitude modulation by the pilot signal $f_1$.

The television receiver which is adapted to receive multivoice or multisound television broadcast programs includes pilot signal discriminator means destined for discriminating the pilot signals $f_1$ and $f_2$ from each other which identify the stereophonic television broadcast program and the heterogeneous multivoice television program, respectively.

Now, a typical one of the hitherto known discriminator apparatus will be reviewed by referring to FIG. 2 which shows in a block-diagram a main portion of a multivoice or multisound signal receiver circuit incorporating therein the prior art discriminator apparatus. In the figure, reference numeral 10 denotes an input terminal for the multivoice signal described above which terminal is coupled to a video detector of a television receiver through a voice frequency discriminator and a sound IF amplifier (not shown). When the multivoice signal received by the associated television receiver equipment is applied to the input terminal 10, the main channel signal of the multivoice signal is supplied to one of the input terminals of a matrix circuit 31 constituting a part of a demodulator circuit 30 through a de-emphasis circuit 21 which serves also as a filter, while the subchannel signal is supplied through a bandpass filter 22 to a frequency discriminator circuit 23 for being detected. Thus, there appears a sub-voice signal at the output of the discriminator circuit 23 which signal is then supplied to the other input terminal of the matrix circuit 31 through a stereophonic/heterogeneous voice program mode changing-over switch 32. In the stereophonic reception mode, the matrix circuit 31 produces stereophonic signals 2L and 2R at both output terminals thereof in a well known manner. The one stereophonic signal 2L is led to an output terminal 41 through a variable resistor 33 and a stationary contact a of a switch 35, while the other stereophonic signal 2R is led out to the other output terminal 42 through a stationary contact a of a switch 34, a variable resistor 33′a and a stationary contact a of a switch 35′. On the other hand, in the heterogeneous multi-voice reception mode, the matrix circuit 31 produces at one of the output terminals the main voice signal which is led out to the output terminal 41 through the same circuit path as for the stereophonic signal 2L. Further, the discriminator 23 produces the subsidiary voice signal at the output thereof, which signal is then led to the output terminal 42 through the de-emphasis circuit 24, a stationary contact b of the switch 34, a variable resistor 33′b, a stationary contact a of a switch 36 and a stationary contact b of the switch 35′. The switch 32 is normally opened and changed over the closed state by a switch change-over circuit 38 described hereinafter in the stereophonic reception mode. The switches 34, 35 and 35′ are normally closed to the respective stationary contacts a. In the stereophonic sound reception mode, these switches 34, 35 and 35′ remain closed to the respective stationary contacts a and are changed over to the respective contacts b in the heterogeneous reception mode under the control of a switch change-over circuit 39 described hereinafter. The switch 39 is normally closed to the stationary contact a. Since the operations of the demodulator circuit and the various switches in both of the stereophonic and the heterogeneous multi-voice reception modes are well known in the art, further detailed description will be unnecessary.

Next, discrimination of the pilot signals as well as the mode switching operation between the stereophonic reception and the heterogeneous multi-voice reception mode will be elucidated.

The pilot carrier signal $f_0$ (55.125 kHz) of the multivoice signal applied to the input terminal 10 is supplied to a pilot signal detector circuit 52 through a band-pass filter 51 having a passing frequency band of 15.125±1 kHz. At the output terminals of the detector circuit 52, there appear the pilot signals $f_1$ (ca. 923 Hz) and $f_2$ (ca. 983 Hz) which are supplied, respectively, to low-frequency narrow fractional band mechanical filters 61 and 63 of a pilot signal discriminator apparatus generally denoted by a reference numeral 60. The signals having passed through the respective mechanical filters 61 and 63 are rectified and smoothed by succeeding rectifying and smoothing circuits 62 and 64, respectively, and thereafter supplied to the switch change-over circuits 39 and 38 of the demodulator circuit 30 which additionally includes the matrix circuit and the switch change-over circuit 37. When the stereophonic pilot signal $f_2$ makes appearance at the output terminal of the mechanical filter 63 of the pilot signal discriminator apparatus 60, the switch change-over circuit 38 responds to the pilot signal $f_2$ to thereby turn on the switch 32 of the demodulator circuit 30 of the receiver, whereby the demodulator circuit 30 is changed over to the stereophonic reception mode. On the other hand, when the pilot signal $f_1$ for the heterogeneous multi-voice signal makes appearance at the output terminal of the filter 61 of the pilot signal discriminator apparatus 60, the switch change-over circuit 39 responds to the pilot signal $f_1$ to change over the switches 34, 35 and 35' of the demodulator circuit 30 of the receiver to the respective stationary contacts b, as the result of which the demodulator circuit 30 is switched to the heterogeneous multi-voice reception mode. In the case of a mono-aural program, both of the subsidiary voice signal and the pilot signals disappear. Accordingly, by making use of this event information, it is possible to change over the switches 35, 35' and 36 to the respective stationary contacts b, whereby only the main voice signal is derived from the output terminals 41 and 42 of the demodulator circuit 30. For the discrimination of the mono-aural program, a fact that no pilot signal components are present may be made use of or alternatively a mono-aural voice discriminator designated by 65 in FIG. 2 may be employed. This discriminator 65 is adapted to discriminatively detect that the subsidiary voice signal or the pilot signals have a sufficiently small amplitude and produce a mono-aural voice program indicating signal $V_3$ at the output thereof.

The prior art discriminator apparatus incorporated in the multi-voice system television receiver requires indispensably the use of the narrow fractional band mechanical filters for discriminating the program identifying signals, as will be appreciated from the above description. This mechanical filter has to be imparted with a passing band width not higher than about 10 $Hz_{pp}$ in view of the required noise-proof performance, which in turn means that severer requirements are imposed on the accuracy and stability of the center frequency (e.g. tolerance must not be greater than ±0.5%). Thus, the filter element utilizable in the low frequency band in the order of about 1 kHz is necessarily restricted to the mechanical filter exhibiting a high Q-value, involving eventually very expensive implementation.

SUMMARY OF THE INVENTION

Accordingly, an object of the invention is to provide a discriminator circuit apparatus in which the low frequency narrow fractional band filter can be inexpensively implemented and which is thus suited for implementation in the form of IC (integrated circuit).

Another object of the invention is to provide a discriminator circuit apparatus which is insusceptible to variation in frequency at the side of a television receiver.

In view of above and other objects which will become more apparent as description proceeds, it is proposed according to an aspect of the invention to provide a first signal source having a frequency $f_1$, a second signal source having a reference frequency $f'_0$ which is closed to the frequency $f_1$, means for obtaining a beat frequency component from the first and the second signal sources, and means for extracting a beat frequency component having a frequency lower than a minimum frequency of the audio frequency to thereby identify the presence of the frequency from the first signal source.

BRIEF DESCRIPTION OF THE DRAWINGS

FIG. 1 is a spectrum diagram of a television multi-voice signal.

FIG. 5 is a signal waveform diagram to illustrate operation of a frequency divider shown in FIG. 4.

FIG. 6 is a signal wave diagram to illustrate operation of the circuit arrangement shown in FIG. 4.

FIG. 10 is a block diagram to show a main arrangement of the discriminator apparatus according to a fifth embodiment of the invention.

DESCRIPTION OF THE PREFERRED EMBODIMENTS

Now, the invention will be described in detail with reference to exemplary embodiments thereof.

Figure 2:
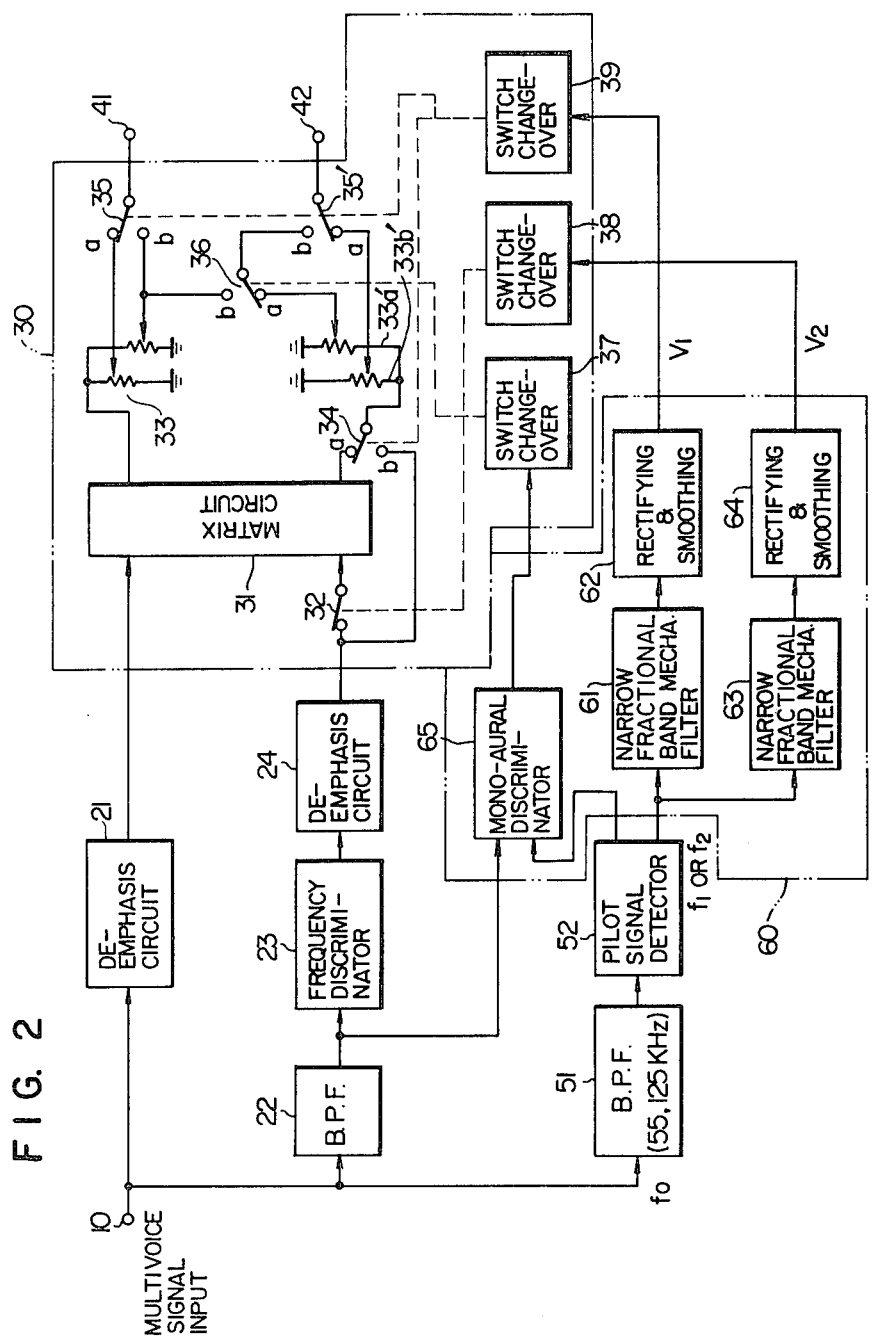
FIG. 2 is a block diagram showing a multi-voice signal receiver circuit incorporating a hitherto known discriminator circuit apparatus.
Figure 3:
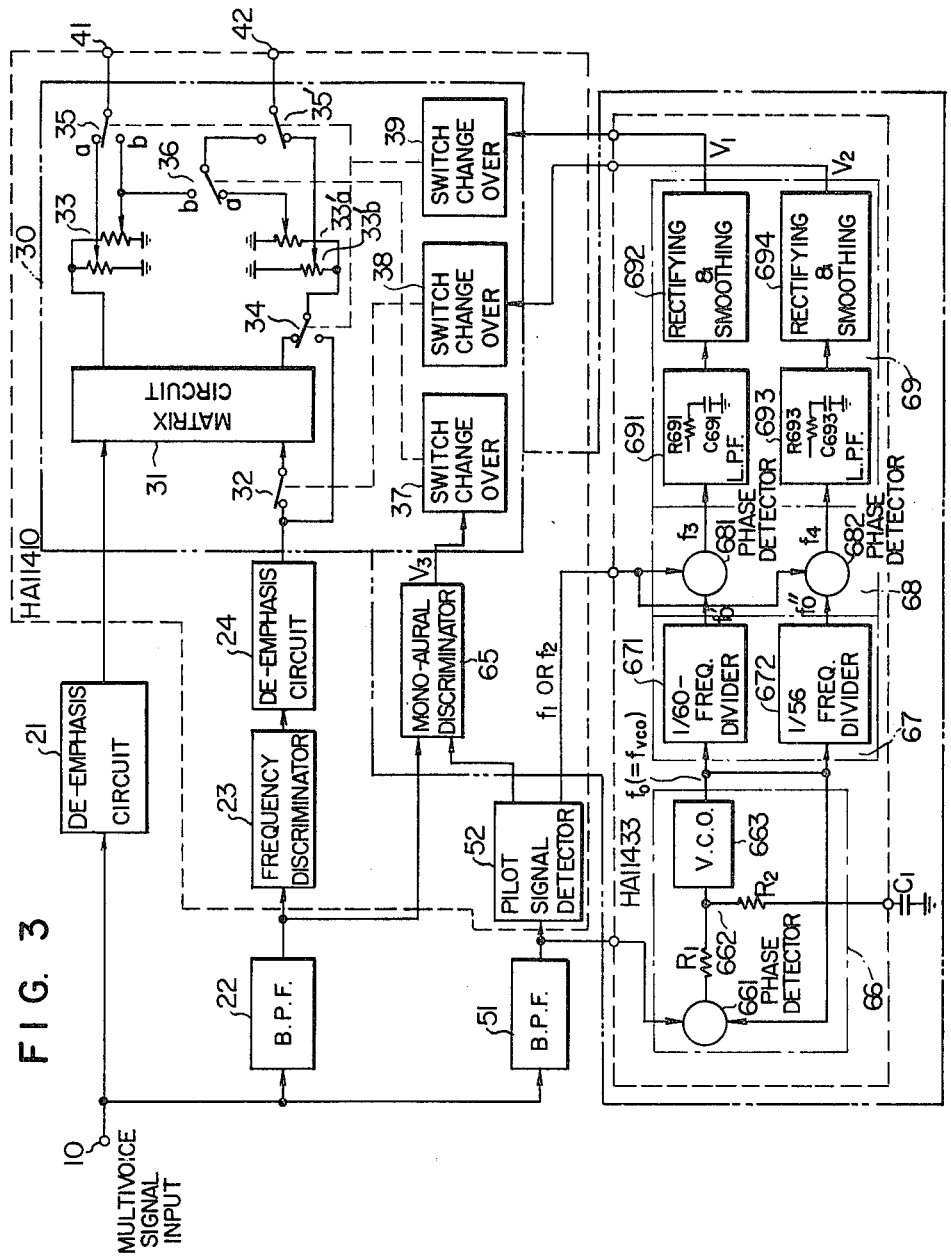
FIG. 3 is a block diagram to illustrate a general arrangement of a discriminator apparatus according to a first embodiment of the invention.

FIG. 3 shows in a block diagram a main portion of a television multi-voice or multi-sound system to which a discriminator apparatus according to an embodiment of the invention is applied. In this figure, the same reference numerals as those used in FIG. 2 denote like or same circuit components, the repeated description of which will be unnecessary. Accordingly, description will be made only on the discriminating apparatus 60 hereunder. Numeral 66 designates a circuit for extracting the pilot carrier signal $f_0$ (55.125 kHz) having passed through the band-pass filter 51. This circuit 66 is implemented in a P.L.L. (phase-locked loop) circuit configuration and includes a phase detector 661, a filter 662 and a voltage-controlled oscillator or V.C.O. 663 which is adapted to oscillate at a frequency (ca. 55.125 kHz) close to that of the pilot carrier signal. These circuit elements cooperate to effectively constitute a filter of a narrow fractional band width which will hereinafter be referred to as the narrow fractional band filter. Consequently, a stable frequency component of 55.125 kHz which is immune to the reception noise can be obtained from the output of V.C.O. 663. Reference numeral 67 denotes a frequency converter for converting the output frequency from V.C.O 663 of the pilot carrier signal extracting circuit 66 to values (or frequencies) $f_0'$ or $f_0''$ which are close to the pilot signal $f_1$ (ca. 923 Hz) or $f_2$ (ca. 983 Hz) for identifying programs to be discriminated. The frequency converter circuit 67 includes a 1/60-frequency divider 671 having a divisor of 60 and a 1/56-frequency divider 672 having a divisor of 56. Thus, there can be obtained at the outputs of the frequency dividers 671 and 672 stable frequency components of about 919 Hz and 984 Hz with high reliability. Here, it should be mentioned that the frequency values $f_0'$ and $f_0''$ which are close to the pilot signal $f_1$ and $f_2$ to be detected are so selected that the frequencies of a differential beat signal produced upon mixing of the signals $f_0'$ and $f_0''$ with $f_1$ and $f_2$ in a mixer circuit described below becomes lower than the lowest audio frequency (16 Hz) e.g. not higher than 10 Hz. Reference numeral 68 denotes the mixer circuit for mixing the converted signal $f'_0$ ($f_0/60$) or $f''_0$ ($f_0/56$) obtained from the frequency converter circuit 67 with the pilot signal $f_1$ or $f_2$ derived through the detector circuit 52 to thereby produce a low frequency beat signal $f_3$ ($=f_1-f'_0$) or $f_4$ ($=f_2-f''_0$). The mixer circuit 68 may be composed of phase detectors 681 and 682. Accordingly, there are produced at the outputs of the phase detectors 681 and 682 the beat signal of 4 Hz and 61 Hz, respectively, for the pilot signal of about 923 Hz ($f_1$) and the beat signals of 64 Hz and 1 Hz, respectively, for the pilot signal of about 983 Hz ($f_2$). Reference numeral 69 denotes a rectifying and smoothing circuit adapted to rectify and smooth the low frequency beat signals outputted from the mixer circuit 68 and supply the smoothed signals to the switch change-over circuits 39 and 38 of the demodulator circuit 30. This circuit 69 comprises low-pass filters 691 and 693 to allow the frequency components lower than about 10 Hz to pass therethrough, and rectifying/smoothing circuitries 692 and 694 for rectifying and smoothing the components having passed through the low-pass filters 691 and 693. The smoothed signals constitute the discriminator output signals $V_1$ and $V_2$.

For example, in the case of a bilingual program, a signal of about 919 Hz will make appearance at the output of the frequency divider 671 while a signal of about 923 Hz appears at the output of the detector circuit 52, as the result of which a beat signal of 4 Hz is produced at the output of the phase detector 681. The beat signal of 4 Hz is supplied through the low-pass filter 69 to the rectifying/smoothing circuitry 692 to be rectified and smoothed, resulting in the production of the bilingual program identifying signal $V_1$ at the output of the rectifying/smoothing circuitry 692.

As can be seen from FIG. 3, each of the low-pass filters 691 and 693 is constituted by a resistor (R) and a capacitor (C). The circuit constants of these low-pass filters are so selected that attenuation is reduced for the frequencies lower than about 10 Hz while attenuation is increased for the frequencies higher than 60 Hz. To this end, values of the resistors $R_{691}$ and $R_{693}$ of the filters 691 and 693 may be selected at 10 kΩ, while the values of capacitors $C_{691}$ and $C_{693}$ of the filters may be set at 4.7 μF, by way of example. In that case, a magnitude of attenuation will amount to $-2.25$ dB at 1 Hz, $-6.77$ dB at 4 Hz, $-25.58$ dB at 61 Hz, and $-25.98$ dB at 64 Hz, respectively. In this manner, magnitudes of attenuation can be made significantly different at 1 Hz and 4 Hz on one hand and at 61 Hz and 64 Hz on the other hand, whereby the signal of 1 Hz or 4 Hz may be extracted effectively.

It should be noted that P.L.L. circuit 66 may be simply replaced by a narrow band filter of 55.125 kHz. Further, this circuit 66 may be spared particularly in the application in which feeble or weak field reception is not prerequisite.

The rectifying/smoothing circuitries 692 and 694 should preferably be of a full-wave rectification type. In the case of half-wave rectification, a detection period of about 1 second is required for detecting a peak value of the frequency component of 1 Hz. In contrast, the full-wave rectification allows the detection period to be reduced to about 0.5 seconds, increasing thus the speed at which the program discrimination is carried out.

In the circuit arrangement described above, the phase detectors 661, 681 and 682 as well as the frequency dividers 671 and 672 can be implemented extremely inexpensively through a well known IC technique. Besides, V.C.O. 663, the low-pass filters 691, 693 and the rectifying/smoothing circuitries can be realized through a known IC technique with a few additional peripheral capacitors and inductors (externally mounted elements). In this way, the discriminating apparatus 60 can be constructed at very low costs by virtue of the arrangement which allows the implementation through IC techniques. In FIG. 3, circuit portions shown as enclosed by broken lines are internal circuitries of IC.

The discriminator apparatus described above is advantageous over the conventional one in respect that Q-value required for the filters can be lowered and that digital IC techniques which have been rendered very inexpensive owing to recent remarkable progress in the art can be effectively and advantageously made use of.

Figure 4:
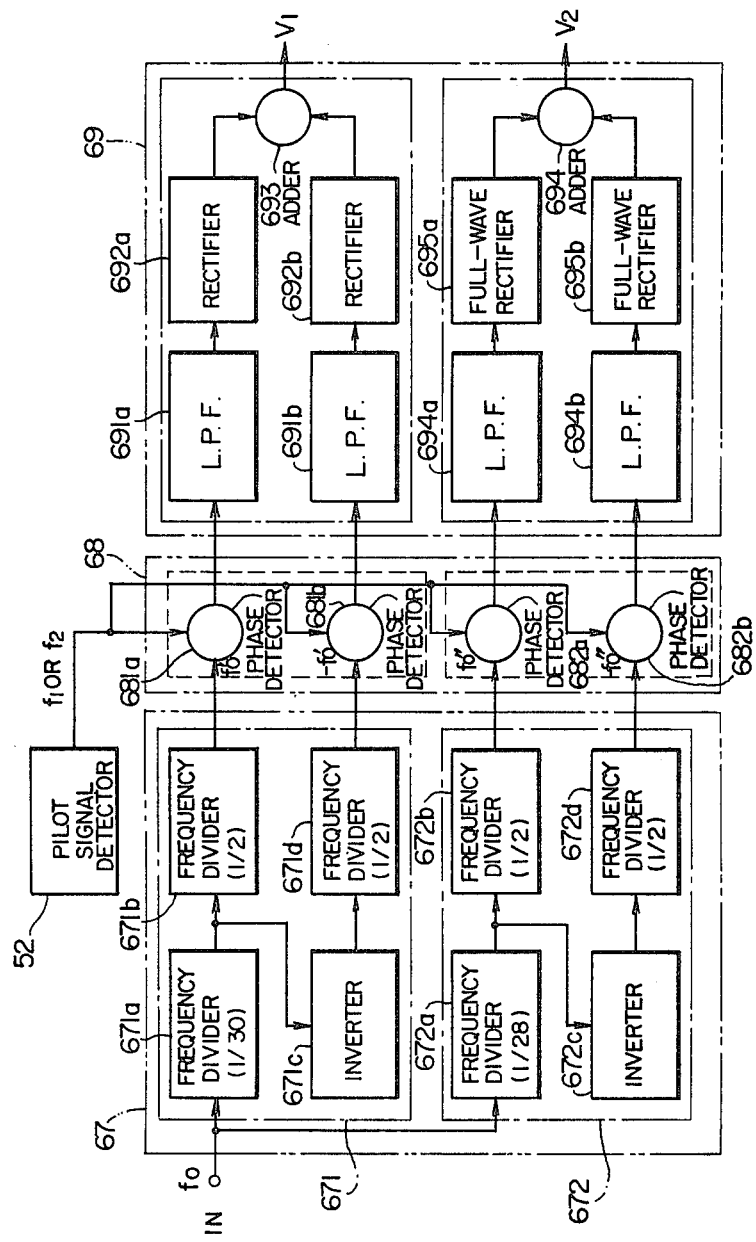
FIG. 4 is a block diagram showing a main portion of the discriminator apparatus according to a second embodiment of the invention.

FIG. 4 shows in a block diagram a discriminator apparatus according to a second embodiment of the invention in which the detection frequency of the program identifying signals can be further enhanced and the rectifying/smoothing circuitries can be rendered unnecessary. In FIG. 4, the like or same parts as those shown in FIG. 3 are denoted by the same reference numerals and detailed description thereof is omitted. Reference symbols 671a, 671b and 671d denote frequency dividers while 671c denotes an inverter. These frequency dividers together with the inverter 671c constitute a frequency dividing circuit for dividing the input signal applied to an input terminal IN, i.e. the pilot carrier signal frequency $f_o$ (55.125 kHz) to a frequency (ca. 919 Hz) which is close to the pilot signal frequency (ca. 923 Hz). In more concrete, a 1/30-divider is used for the frequency divider 671a, while 1/2-divider is used for the frequency dividers 671b and 671d. Consequently, when the input signal is of 55.125 kHz, the output signal of about 1.838 kHz will appear at the output of the 1/30-frequency divider 671a, and output signals of about 919 Hz will make appearance at the outputs of the 1/2-frequency dividers 671b and 671d, respectively.

FIG. 5 graphically shows waveforms of the output signals from the frequency dividers and the inverter described above, in which the waveform of the output signals from the 1/30-frequency divider 671a, the 1/2-frequency divider 671b, the inverter 671c and the 1/2-frequency divider 671d are shown at a, b, c and d, respectively. It will be seen from FIG. 5 that phase difference in the order of 90° is present between the output signals from the 1/2-frequency dividers 671b and 671d.

Reference characters 681a and 681b denote phase detectors which cooperate to constitute a mixer circuit for mixing the output signals from the 1/2-frequency dividers 671b and 671d with the output signal from the detector circuit 52 to thereby produce a beat signal of the low frequency. More specifically, when the output signal from the detector circuit 52, i.e. the pilot signal is of 923 Hz, a beat signal of 4 Hz is produced as the output signal. When the former is of 983 Hz, the output beat signal is of 1 Hz.

Reference characters 691a and 691b denote low-pass filters which allow the signals of frequencies lower than about 5 Hz, for example, to pass therethrough. Reference characters 692a and 692b denote full-wave rectifiers through which the signal of about 4 Hz having noise components eliminated by the low-pass filters 691a and 691b is subjected to full-wave rectification, as a result of which two pulsating signals (of ca. 2×4 Hz) such as shown by a broken line and a solid lines are produced as the output signals. The presence of difference beat frequency of about 4 Hz and the phase difference in the order of 90° between the pulsating signals is ascribable to the fact that the phase difference of about 90° between the output signals from the 1/2-frequency dividers 671b and 671d is transmitted as it is through the phase detectors 681a and 681b, because the phase detectors will inherently operate to output the phase difference between the input signals. Numeral 693 denotes an adder for adding together the full-wave rectified signals (pulsating signals) output from the rectifiers 692a and 692b thereby to produce a pulsating signal (of about 4×4 Hz) as shown in FIG. 6 by a dotted broken line. This adder 693 cooperates with the frequency dividers, the phase detectors, the low-pass filters and the full-wave rectifiers described above to constitute the discriminating circuit apparatus for identifying the bilingual program signal (i.e. the pulsating signal of 4×4 Hz).

Reference character 672a denotes a 1/28-frequency divider, 672b and 672d denote 1/2-frequency dividers, 672c denotes an inverter, 682a and 682b denote phase detectors, 694a and 694b denote low-pass filter to pass the low frequency signals of frequencies lower than about 5 Hz, 695a and 695b denote full-wave rectifiers, and 696 denotes an adder. These circuitries constitute together a discriminating circuit for the stereophonic program signal (i.e. pulsating signal of 4×1 Hz). Since the circuit arrangement and operation of the stereophonic program discriminating circuit is similar to those of the bilingual program signal discriminating or identifying circuit described above, further description will be unnecessary.

The advantageous feature of the circuit arrangement according to the second embodiment of the invention described above resides in that the output signal can be obtained in a form as if it were smoothed, merely by adding together the two pulsating detection signals by virtue of the fact that the period for peak detection is decreased to 1/4 as compared with that of the first embodiment described hereinbefore in conjunction with FIG. 3. The absence of the smoothing circuit means that no delay is produced in respect of the detecting time, which is of course extremely preferable in view of the performance of the receiver as a whole. Further, the circuit arrangement is suited to be implemented in a form of IC.

The second embodiment described above by referring to FIG. 4 may be referred to as the four-phase rectification type in contrast to the full-wave rectification type of the first embodiment. Although the four-phase rectification type circuit is shown, it will be appreciated that the invention is never restricted to the four-phase rectification type but can be embodied in five-phase, six-phase or polyphase rectification type circuit in dependence on the number of the program identifying signals with the number of the low-pass filters being correspondingly proportionally increased. On the other hand, the discriminator circuit apparatus according to the second embodiment may be realized also in a two-phase rectification type arrangement. In that case, either the bilingual program signal discriminating circuit or stereophonic program discriminating circuit may be omitted. In other words, in order to discriminate the bilingual program and the stereophonic program, it is not necessary to utilize all of the two program identifying signals, but the single program identifying signal selected arbitrarily and combined with a simple logic circuit will be adequate for discriminating the two multi-voice modes from each other.

Figure 7:
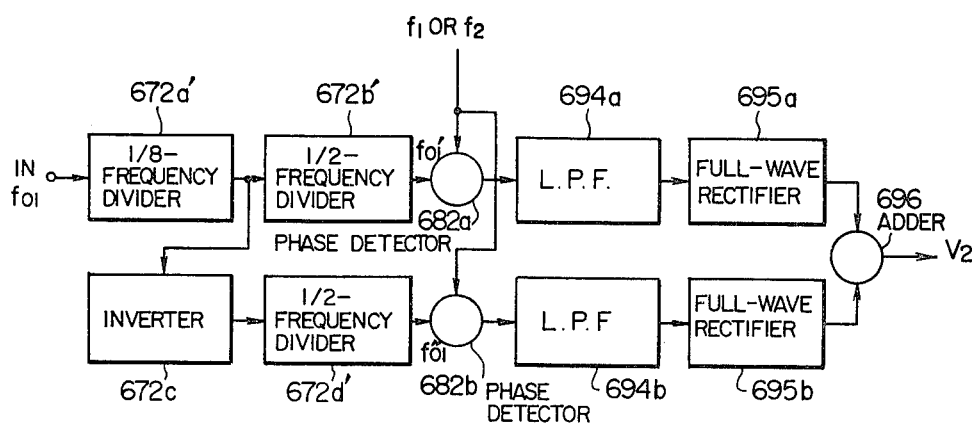
FIG. 7 is a block diagram to show a main portion of the discriminator apparatus according to a third embodiment of the invention.

In the description of the discriminator apparatus according to the second embodiment of the invention, it has been assumed that the pilot carrier signal of 55.125 kHz is made use of as the input signal source coupled to the input terminal IN. However, it is equally possible to utilize as the input signal source the horizontal synchronizing signal of 15.75 kHz of the multi-voice type television receiver. In that case, the frequency division ratio of the frequency divider for the bilingual program signal discriminating circuit shown in FIG. 4 is selected equal to 1/16 so that output frequency of about 984 Hz can be obtained, while that of the frequency divider of the stereophonic program discriminating circuit is selected equal to 1/17 so that output frequency of about 926 Hz can be obtained. An example of such circuit arrangement is shown in FIG. 7 in connection with the stereophonic program discriminating circuit according to a third embodiment of the invention. Referring to FIG. 7, the input terminal IN is supplied with horizontal blanking pulse or horizontal synchronizing signal of 15.75 kHz produced constantly in a horizontal deflection circuit or horizontal synchronizing circuit of the television receiver. The input signal $f_{ol}$ of 15.75 kHz is subjected to frequency division through a 1/8-frequency divider 672'a to be reduced to 1.969 kHz which is then decreased to about 984 Hz through 1/2-frequency dividers 672'b and 672'd, whereby a beat signal of 4 Hz is obtained by the succeeding phase detectors 682a and 682b to identify a stereophonic mode program.

In the case of a color television receiver, an oscillator producing a frequency of 3.579545 MHz is indispensably used for a color synchronizing generator circuit. This frequency signal can obviously be utilized as the reference input signal source by subjecting the color subcarrier of 3.579545 MHz to the frequency division at the ratio of about 1/3643 to obtain the frequency of about 983. Although the arrangement of the frequency dividers to this end will become complicated, the frequency precision can be enhanced.

The horizontal synchronizing frequency of 15.75 kHz recited in the foregoing description is according to the Black and White Broadcast Standards. According to the Color Broadcast Standards, the horizontal synchronizing frequency is equal to 15.734 kHz with the corresponding pilot frequency being equal to 55.07 kHz. However, difference in the concerned frequency between the two type broadcasts is only in the order of about 0.1% which can be neglected.

In the embodiments described above, the timing transmission signal of high reliability is made use of as the reference input signal $f_o$ or $f_{ol}$. However, in the case of the television receiver which incorporates an oscillator capable of producing an oscillation frequency signal in a stable manner such as a crystal oscillator, the output frequency of the built-in oscillator can be utilized as the reference input signal $f_0$ or $f_{01}$. In brief, a signal having a stabilized frequency can be used as the reference input signal.

The function of the rectifiers described hereinbefore is to discriminate the beat signals. Accordingly, the rectifier may be replaced by a non-linear element such as diode or the like.

Figure 9:
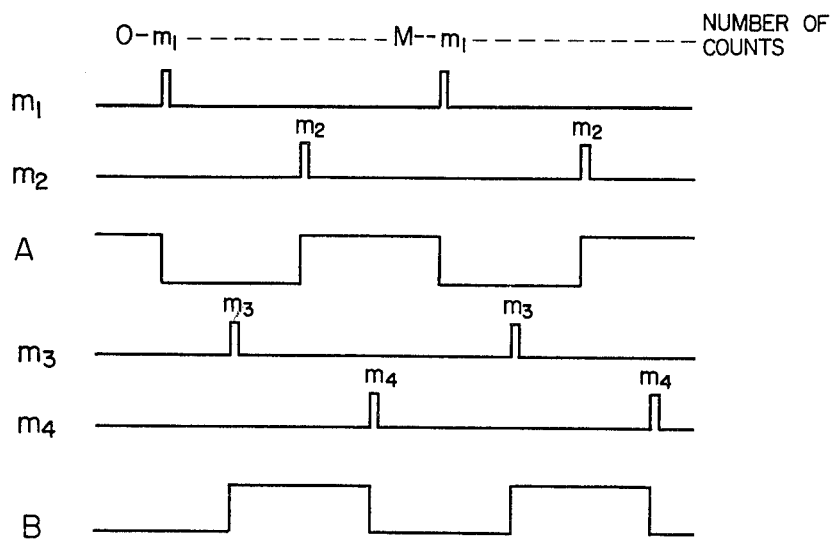
FIG. 9 is a signal waveform diagram to illustrate operation of the circuit arrangement shown in FIG. 8.
Figure 8:
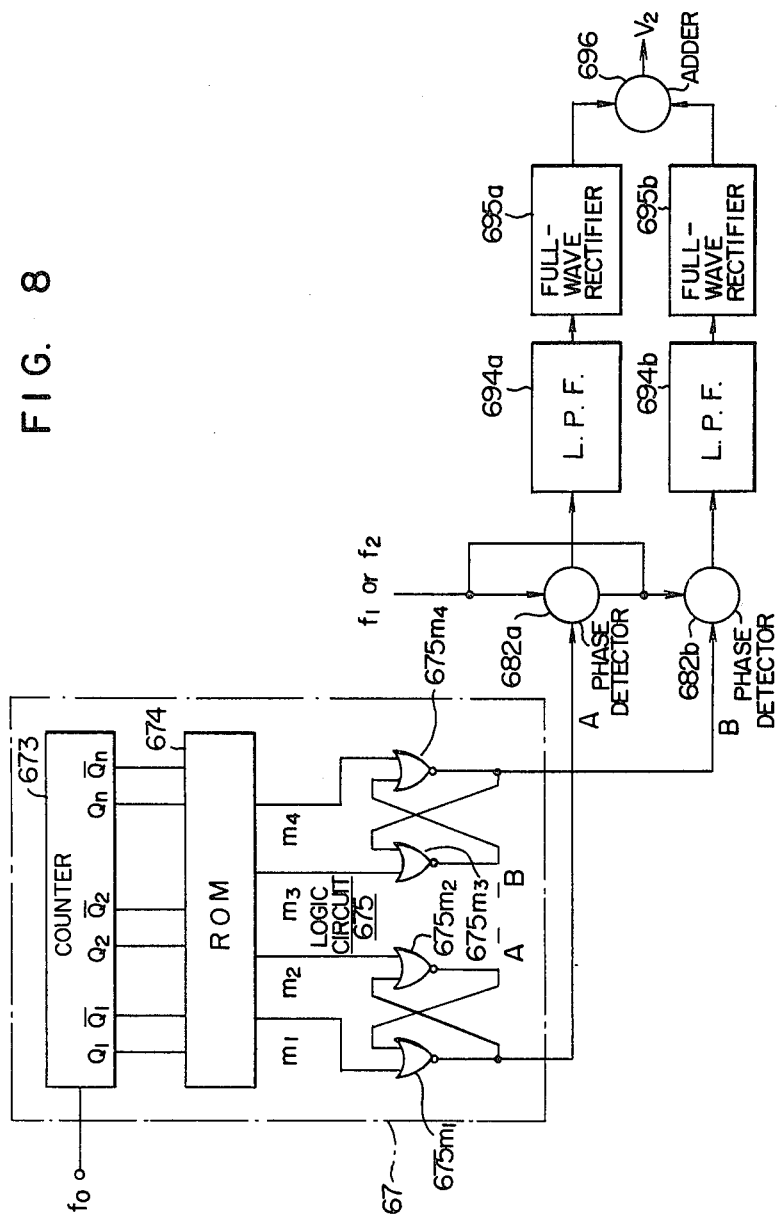
FIG. 8 is a block diagram to show a main portion of the discriminator apparatus according to a fourth embodiment of the invention.

FIG. 8 shows a main portion of the discriminator apparatus according to a fourth embodiment of the invention in which the frequency converter circuit 67 is constituted by a counter 673, a ROM (read-only memory) 674, and a logic circuit generally denoted by numeral 675. The counter 673 has an N bit capacity and serves to count the frequency of the reference input signal $f_o$ up to a maximum count M, wherein the count outputs are produced at predetermined count numbers $m_k$ ($m_1$, $m_2$, $m_3$, $m_4$) and reset to zero when the maximum count number M has been attained. The ROM 674 is coupled to terminals $Q_1$, $\overline{Q}_1$, ..., $Q_n$, $\overline{Q}_n$ of the counter 673. When the count outputs appear at the terminals $Q_1$, $\overline{Q}_1$, ..., $Q_n$, $\overline{Q}_n$ at the count numbers $m_k$ ($m_1$, $m_2$, $m_3$, $m_4$), the ROM produces pulses $m_1$, $m_2$, $m_3$ and $m_4$ which are shown in FIG. 9. The logic circuit 675 is coupled between the ROM 674 and the mixer circuit 68 and serves to produce signal waveforms A and B shown in FIG. 9 in response to the pulses $m_1$, $m_2$, $m_3$ and $m_4$. The signal waveforms A and B correspond to the signals b and d shown in FIG. 5, respectively. The logic circuit to this end may be constituted by OR circuits 675 $m_1$, 675 $m_2$, 675 $m_3$ and 675 $m_4$.

With such circuit arrangement described above, when the values of the count numbers $m_1$, $m_2$, $m_3$ and $m_4$ are appropriately selected, the output waveforms (clocks) A and B (FIG. 9) which are out of phase by ca. 90° and have a duty ratio of about 50% can be produced at the output of the logic circuit 675, even if the maximum count number is not equal to a multiple of 2 or even when the duty ratio of the input clock signal $f_o$ is not 50%. (In this connection, it should be noted that in the case of the discriminator apparatus shown in FIG. 4, the output of the frequency divider 671a has a duty ratio of 50% as is shown in FIG. 5 at a.)

In order to discriminate the pilot signals $f_1$ and $f_2$ which have frequencies close to each other, the frequency converter circuit for discriminating the pilot signal $f_1$ may be constituted by the frequency dividers, the inverter and so forth in a manner shown in FIG. 4, while the frequency converter circuit for discriminating the pilot signal $f_2$ may be constituted by a counter, ROM, logic circuit and so forth in a manner shown in FIG. 8.

FIG. 10 shows a fifth embodiment of the invention which corresponds to a modification of the first embodiment shown in FIG. 3 in which arrangement is made such that the frequency of the low frequency beat signal is adequately low with a bandwidth of a low-pass filter being narrower. In FIG. 10, the like parts as those shown in FIG. 3 are denoted by the same reference numerals. In FIG. 10, reference numeral 664 denotes a 1/N-frequency divider (N is an integer greater than 1), and 663' denotes a voltage controlled oscillator or V.C.O. which oscillates at a frequency of about N×55.125 kHz. The 1/N-frequency divider 664 and V.C.O. 663' constitute a known P.L.L. (phase locked loop) circuit in cooperation with a phase detector 661 and a filter 662.

A characteristic feature of the fifth embodiment of the arrangement described above resides in that the V.C.O. 663 of the first embodiment shown in FIG. 3 is separated into two oscillators, i.e. V.C.O. 663' and the 1/N-frequency divider 664. The circuit arrangement shown in FIG. 10 is same as the one shown in FIG. 3 in that the P.L.L. circuit is constituted by the phase detector 661, the V.C.O. 663' and the frequency divider 664. However, it should be noted that there is produced at the output of the V.C.O. 663' the reference clock or timing signal of the frequency N times as high as that of V.C.O. 663 shown in FIG. 3. Accordingly, by selecting appropriately the dividing ratio of the frequency divider 670 coupled to the output of V.C.O. 663', it is possible to obtain a frequency converted output signal which approximates to the pilot signal (amplitude modulated frequency) with an improved accuracy as compared with that of the first embodiment shown in FIG. 3.

Assuming that the divisor N of the frequency divider 664 is selected equal to 14, while the frequency divider 670 is imparted with the divisor equal to 836, then the output frequency of about 923 Hz ($\approx$55.125 kHz×14/836) can be obtained which substantially coincides with the frequency of the pilot signal which identifies the bilingual program. Accordingly, the frequency of the low frequency beat component output from the succeeding phase detector (not shown) can be made substantially equal to zero Hz, to thereby allow the band width of the succeeding low-pass filter to be narrower and thus improve the noise-proof property.

In brief, the circuit arrangement according to the fifth embodiment of the invention allows the frequency dividing ratio to be substantially arbitrarily a given ratio of rational numbers and may be generally referred to as a frequency multiplier/divider circuit. This arrangement can be applied also to the second and third embodiments of the invention described hereinbefore. Namely, the frequency dividers 671a and 672a shown in FIG. 4 as well as the frequency divider 672'a can be each constituted by the frequency multiplier/divider circuit.

The envelope detector for detecting the amplitude modulated waveform of the pilot signal described above may be replaced by a synchronous detector by making use of the carrier of 55.125 kHz reproduced through P.L.L. means described hereinbefore in conjunction with the first embodiment shown in FIG. 3. This carrier is available from the output of the V.C.O. 663 in the case of the apparatus shown in FIG. 3, and available from the output of the frequency divider 664 in the case of the arrangement shown in FIG. 10. In this connection, it should be noted that the phase of the carrier is delayed about 90° relative to the pilot signal input to the phase detector 66 under the control of P.L.L.

Figure 11:
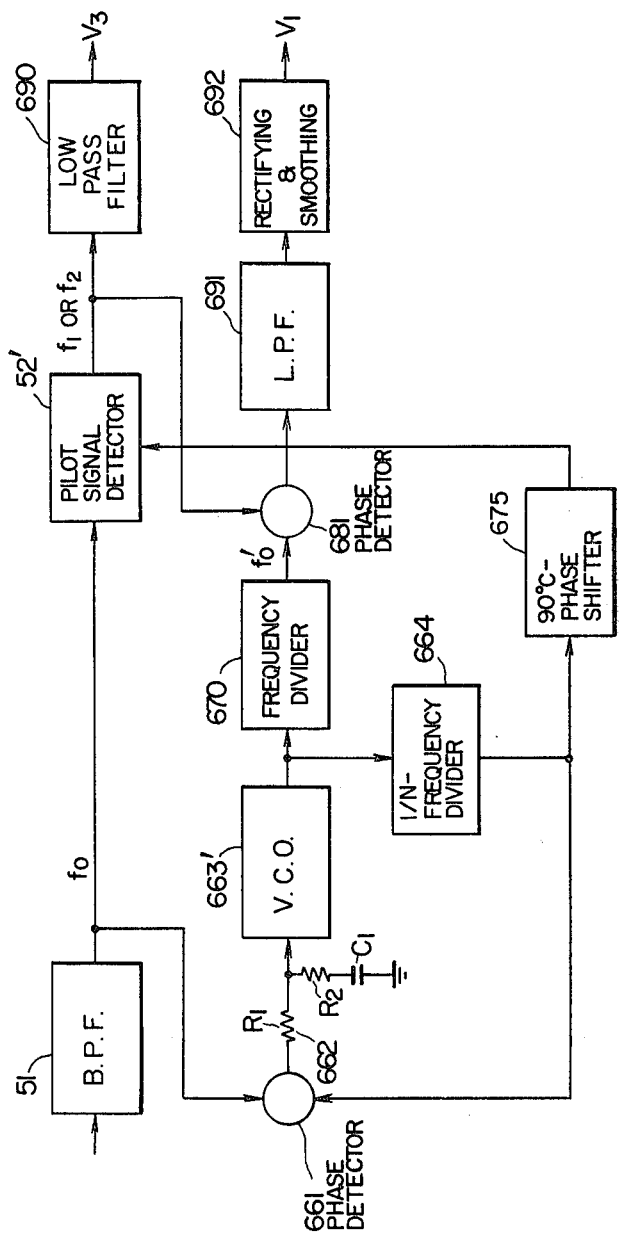
FIG. 11 is a block diagram to show a main portion of the discriminator apparatus according to a sixth embodiment of the invention.

As is well known, S/N ratio (signal-to-noise ratio) of the output signal from the synchronous detector is better than S/N ratio of the output signal from the envelope detector. Starting from this fact, it is possible to detect a mono-aural voice program identifying signal with an improved S/N ratio. A sixth embodiment of the invention to this end is shown in FIG. 11, in which parts serving for the same function as those shown in FIG. 10 are denoted by the same reference symbols and repeated description of these parts will be omitted. Reference numeral 675 denotes a 90°-phase shifter for compensating the phase difference of 90° brought about by P.L.L., as described above, 52' denotes a synchronous detector, and 690 denotes a low-pass filter for passing therethrough the frequency components lower than about 5 Hz. On the basis of the output from the low-pass filter 690, presence or absence of the pilot signal is determined. Thus, the output from the filter 690 can be utilized as a mono-aural voice program identifying signal $V_3$. It should be mentioned that the 90°-phase shifter shown in FIG. 11 may be implemented by resorting to the polyphase technique described hereinbefore in conjunction with FIGS. 4 and 5.

Figure 12:
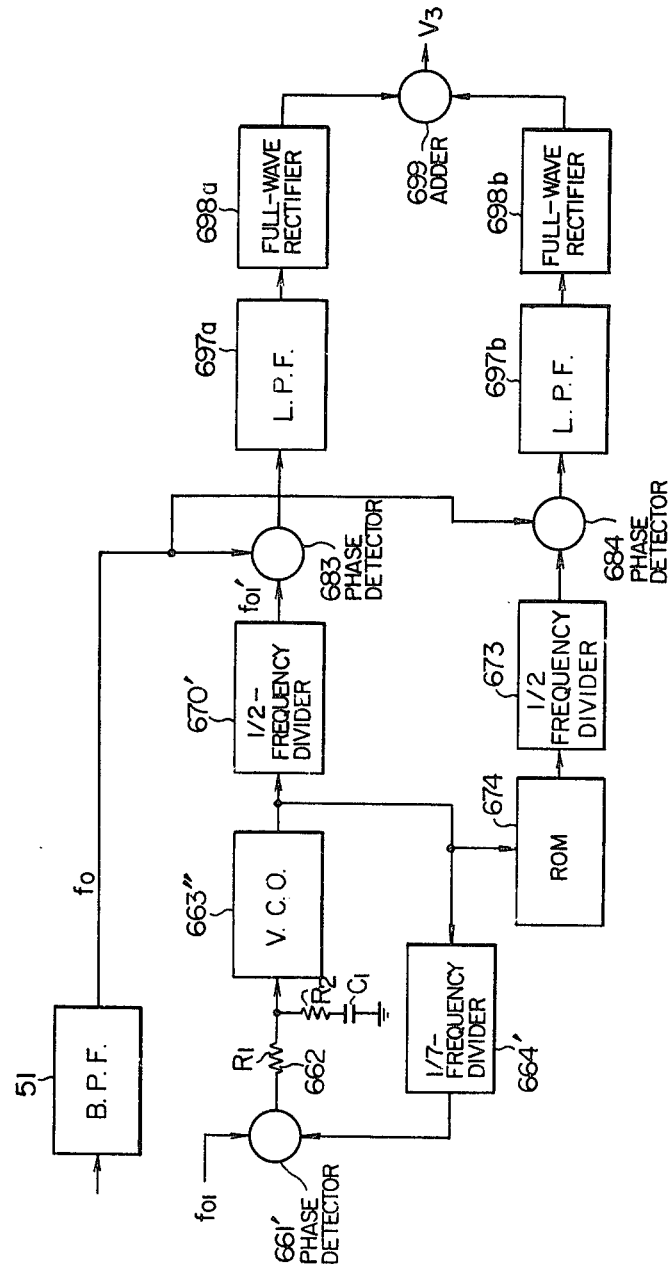
FIG. 12 is a block diagram to show a main portion of a seventh embodiment of the invention.

FIG. 12 shows a seventh embodiment of the invention in which the mono-aural program identifying signal $V_3$ is derived from the horizontal synchronizing signal with the aid of the polyphase technique. In this figure, $f_o$ represents the pilot carrier signal (55.125 kHz), and $f_{ol}$ represents the horizontal blanking signal or the horizontal synchronizing signal having the repetition frequency of 15.75 kHz, as described hereinbefore. Reference numeral 661' denotes a phase detector, 663'' denotes V.C.O. (voltage controlled oscillator) adapted to produce an output frequency of 7×15.75 kHz, and 664' denotes a 1/7-frequency divider. These components constitute a known P.L.L. Numeral 674 denotes an inverter, and 670' and 673 denote ½-frequency dividers, respectively. In accordance with the principle described hereinbefore in conjunction with FIG. 5, the phase difference between the outputs from the ½-frequency dividers 670' and 673 is about 90°. The repetition frequency of these outputs coincides with the pilot signal frequency of 55.125 kHz. Numerals 683 and 684 denotes phase detectors, the outputs of which are zero-beat signals with a phase shift of 90° to each other. Numerals 697a and 697b denote low-pass filters adapted to pass therethrough the frequency signal components lower than about 5 Hz, and 698a and 698b denote full-wave rectifiers which may better be referred to as the absolute value detectors, since the input signals to these rectifiers are zero-beat signals, that is d.c. current signal. Numeral 699 denotes an adder having an output terminal at which the intended signal $V_3$ for identifying the presence or absence of the mono-aural program can be obtained.

Now, description of the phase difference of 90° will be complemented. Assuming that the phase difference between the input signals to the phase detector 683 is represented by $\theta$, the output of the low-pass filter 697a is represented by $A \cos \theta$, where A represents amplitude of the input pilot signal. On the other hand, since the phase difference between the input signals to the phase detector 684 is given by $(\theta - 90°)$ at that time, the output from the low-pass filter 697b is given by $A \cos (\theta - 90°) = A \sin \theta$. Accordingly, the output signal $V_3$ from the adder 699 is given by $|A \cos \theta| + |A \sin \theta|$. The value of $\theta$ will vary at random among different broadcast stations. However, when $\theta$ is taken along the abscissa with the output signal $V_3$ taken along the ordinate, a relationship similar to the waveform shown in FIG. 6 by the dotted broken line is obtained, whereby the magnitude of the input pilot signal can be determined with the aid of the output signal $V_3$. The mono-aural program identifying signal can be utilized as a signal source of high quality for performing the desired change-over operations through the switch 30 and the change-over circuit 37 described hereinbefore.

The reference or standard timing signal source such as the pilot signal frequency, horizontal synchronizing frequency, color synchronizing frequency or the like may be replaced by the output signal of an appropriate oscillator having high frequency stability.

As will be appreciated from the foregoing description, the present invention has now provided an improved discriminator apparatus which can be realized inexpensively and is suited for implementation in a form of integrated circuit or IC, and which obviates the need for an expensive low frequency filter having a narrow fractional band width, whereby a television receiver with a multi-voice system can be manufactured more economically as compared with the hitherto known system.

Further, the invention has solved the problem of the hitherto known system that the center frequency of the narrow fractional band filter is inherently susceptible to variation, by using a stable frequency standard, whereby the causes for frequency variation at the receiver side are eliminated.

We claim:
1. A discriminator apparatus comprising:
mixing means for mixing two input signals supplied thereto;
first signal supplying means for supplying a signal having a frequency $f_1$ to be detected to said mixing means as one of said input signals;
second signal supplying means for supplying a reference signal having a frequency $f_0'$ close to said frequency $f_1$ to said mixing means as the other input signal, said reference frequency $f_0'$ being so selected that a frequency of a differential beat signal produced from said mixing means upon mixing of said reference signal with said signal to be detected is an inaudible predetermined frequency; and
low band frequency signal detecting means coupled to said mixing means for extracting said differential beat signal having an inaudible frequency from the output signal of said mixing means, the presence of said signal to be detected being identified when said differential beat signal having an inaudible frequency is detected by said low band frequency signal detecting means,
wherein said mixer means includes first and second mixers each of which is supplied with two input signals and adapted to mix said input signals thereby to produce a differential beat signal;
said second signal supplying means includes a first frequency divider adapted to receive the signal having the frequency $f_0$ to a first signal having a frequency f through frequency division, a phase inverter coupled to said first frequency divider for inverting said signal of the frequency f to form a second signal having a frequency of f, and second and third frequency dividers coupled to said first frequency divider and said phase inverter for converting said first and second signals of frequency f to third and fourth signals having frequency $f_0'$ with a duty ratio of about 50% and phase difference of 90° to each other, said frequency $f_0'$ (signals a, b) being close to the frequency $f_1$ of said signal to be detected and so selected that frequencies of differential beat signal (b, d) produced from said first and second frequency mixers upon mixing of said reference signal with said signal to be detected are an inaudible frequency; and said low band frequency signal detecting means includes first and second low-pass filters coupled to said first and second frequency mixers, respectively, and adapted to extract said differential beat signals (b, d) having inaudible frequencies from the outputs of said first and second frequency mixers, first and second rectifiers coupled to said first and second low-pass filters for performing full-wave rectifications of said differential beat signals (b, d), respectively, and an adder coupled to said first and second rectifiers for adding together the full-wave rectified signals to thereby produce a pulsating signal (difference beat signal × two phases).

2. A discriminator apparatus as set forth in claim 1, wherein each of said first and second frequency mixers comprises a phase detector, said phase inverter comprises an inverter, and each of said low-pass filters comprises a RC-filter circuit having such time constant as to provide small attenuation only for the low frequency beat signal having a frequency not higher than 10 Hz.

3. A discriminator apparatus comprising:

mixing means for mixing two input signals supplied thereto;

first signal supplying means for supplying a signal having a frequency $f_1$ to be detected to said mixing means as one of said input signals;

second signal supplying means for supplying a reference signal having a frequency $f_0'$ close to said frequency $f_1$ to said mixing means as the other input signal, said reference frequency $f_0'$ being so selected that a frequency of a differential beat signal produced from said mixing means upon mixing of said reference signal with said signal to be detected in an inaudible predetermined frequency; and low band frequency signal detecting means coupled to said mixing means for extracting said differential beat signal having an inaudible frequency from the output signal of said mixing means, the presence of said signal to be detected being identified when said differential beat signal having an inaudible frequency is detected by said low band frequency signal detecting means, wherein said mixing means includes first and second frequency mixers each supplied with two input signals and adapted to mix said input signals thereby to produce a differential beat signal;

said second signal supplying means includes a counter having a maximum count number M which is adapted to receive a signal having a stabilized frequency $f_0$ for counting said frequency $f_0$ and producing a plurality of count pulses ($m_1$, $m_2$, $m_3$, $m_4$) at a plurality of count numbers $m_k$ ($m_1$, $m_2$, $m_3$, $m_4$), said counter being reset to zero at the maximum count number M where $M > m_1$, $m_2$, $m_3$, $m_4$, and a logic circuit coupled to said counter for producing first and second pulse signals (A and B) in response to said count pulses, said first and second pulse signals (A and B) having duty ratio of about 50% and phase difference of 90° relative to each other and being selected at such frequencies that the frequencies of the differential beat signals produced upon mixing of said first and second pulse signals with said signal to be detected through said first and second mixers are inaudible frequencies; and said low band frequency signal detector means includes first and second low-pass filters coupled to said first and second frequency mixers, respectively, for extracting the differential beat signals (A, B) having respective inaudible frequencies from the outputs of said mixers, first and second rectifiers coupled to said first and second low-pass filters for performing full-wave rectification of said differential beat signals and an adder coupled to said first and second rectifiers to add together the full-wave rectified signals from said rectifiers to thereby produce a pulsating signal (differential beat signal × two phases).

4. A discriminator apparatus as set forth in claim 3, wherein each of said first and second frequency mixers comprises a phase detector, said counter having a maximum count number M and being adapted to produce count pulses ($m_1$, $m_2$, $m_3$, $m_4$) at the count numbers ($m_1$, $m_2$, $m_3$, $m_4$) and to be reset to zero at the maximum count number M ($M > m_1$, $m_2$, $m_3$, $m_4$), said logic circuit including a first OR circuit for receiving the count pulses ($m_1$, $m_2$) from said counter to output a first pulse signal (A) which has a duty ratio of about 50% and is selected at such frequency that the frequency of a differential beat signal produced by said first mixer upon mixing of said first pulse signal (A) with said signal to be detected is an inaudible frequency, a second OR circuit for receiving said count pulses to produce a second pulse signal (B) which has a duty ratio of about 50% and has such a frequency that the frequency of a differential beat signal produced from said second mixer upon mixing of said second pulse signal with said signal to be detected is same as the frequency of said first pulse signal (A) and has a phase difference of about 90° relative to said first pulse signal (A), and each of said first and second low-pass filters comprising a RC-filter circuit having a circuit constant which is so set as to provide a small attenuation to the low frequency beat signal having a frequency not higher than 10 Hz while providing different magnitude of attenuation to the beat signal having a frequency higher than 10 Hz.

5. A discriminator apparatus comprising:

a first and a second frequency mixer means each supplied with two input signals for producing a zero beat signal;

a first signal supply means for supplying a signal to be detected having a frequency ($f_0$) to said first and second frequency mixers as one of the input signals thereof;

a second signal supply means for supplying a reference signal having the same frequency as said frequency ($f_0$) but a phase difference of 90° to said first and second frequency mixer means as the other one of the input signals thereof, said second signal supply means comprising a P.L.L. circuit, including a voltage-controlled oscillator receiving a signal of a frequency ($f_{01}$) and causing oscillation, thereby to produce the oscillator output of a frequency ($f_{VCO}$), first converter circuit means connected to said P.L.L. circuit for converting the signal of said oscillator frequency ($f_{VCO}$) into a reference signal having the same frequency as that of the signal to be detected, and second converter circuit means connected to said P.L.L. Circuit for inverting the phase of said oscillator output signal and converting said oscillator output signal into a signal ($-f_{01}'$) of the same frequency as that of the signal to be detected;

a first circuit and a second circuit connected to said first and second mixer means for passing components of not more than about 5 Hz and rectifying said components, thereby to extract said components in the form of d.c. signals; and an adder connected to said first circuit and said second circuit for adding said d.c. signals therefrom, thereby to detect the presence of the signal ($f_0$) to be detected by the presence of an output from said adder.

* * * * *